United States Patent
Räsänen

(10) Patent No.: US 6,445,924 B1
(45) Date of Patent: *Sep. 3, 2002

(54) METHOD AND APPARATUS FOR IMPLEMENTING HANDOVER IN A MOBILE COMMUNICATIONS SYSTEM

(75) Inventor: Markku Räsänen, Espoo (FI)

(73) Assignee: Nokia Networks Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/435,731

(22) Filed: Nov. 8, 1999

Related U.S. Application Data

(63) Continuation of application No. PCT/FI98/00408, filed on May 13, 1998.

(30) Foreign Application Priority Data

May 13, 1997 (FI) .................................. 972024

(51) Int. Cl.⁷ ................................ H04Q 7/20
(52) U.S. Cl. ................ 455/437; 455/436; 455/442; 455/453
(58) Field of Search ................ 455/436, 437, 455/442, 453, 560, 561; 370/331, 332

(56) References Cited

U.S. PATENT DOCUMENTS

| | | | |
|---|---|---|---|
| 5,241,685 A | * 8/1993 | Bodin et al. | 455/453 |
| 5,479,409 A | 12/1995 | Dupuy et al. | |
| 5,542,098 A | 7/1996 | Bonta | |
| 5,666,356 A | * 9/1997 | Fleming et al. | 370/328 |
| 5,912,884 A | * 6/1999 | Park et al. | 370/331 |
| 5,991,626 A | * 11/1999 | Hinz et al. | 455/436 |
| 5,991,627 A | * 11/1999 | Honkasalo et al. | 455/437 |
| 6,041,235 A | * 3/2000 | Aalto | 455/437 |
| 6,219,550 B1 | * 4/2001 | Kanerva et al. | 455/436 |
| 6,327,472 B1 | * 12/2001 | Westroos et al. | 455/450 |

FOREIGN PATENT DOCUMENTS

| | | |
|---|---|---|
| EP | 0589753 | 3/1994 |
| EP | 0699011 | 2/1996 |
| EP | 0615395 | 11/1997 |
| FI | 100445 | 11/1997 |
| SE | 505 915 | 10/1997 |
| WO | WO 9312587 | 6/1993 |
| WO | WO 9708909 | 3/1997 |
| WO | WO 9739599 | 10/1997 |
| WO | WO 9741698 | 11/1997 |
| WO | WO 9821908 | 5/1998 |

OTHER PUBLICATIONS

The GSM System for Mobile Communications; Mouly, et al. GSM 08.08 (version 4.7.1) European Telecommunication Standards Institute ETSI, 1992.

* cited by examiner

Primary Examiner—Edward F. Urban
Assistant Examiner—Tilahun Gesesse
(74) Attorney, Agent, or Firm—Altera Law Group, LLC

(57) ABSTRACT

Traffic load in a congested cell in a mobile communication system is controlled by handovers into nearby cells which are less congested. Parametrisation and signalling are reduced based on integration of the functionality in one network element.

7 Claims, 8 Drawing Sheets

METHOD AND APPARATUS FOR IMPLEMENTING HANDOVER IN A MOBILE COMMUNICATIONS SYSTEM

This application is a continuation of PCT/FI98/00408 filed May 13, 1998.

FIELD OF THE INVENTION

This invention relates to reduction of the traffic load from a congested cell in a mobile communications system.

BACKGROUND OF THE INVENTION

In mobile communications systems mobile stations and base transceiver stations may set up connections through the channels of a so-called radio interface. A certain frequency range is always allocated for use by the system. To obtain sufficient capacity in the mobile communications system on this limited frequency band, the channels in use must be used several times. For this reason, the coverage area of the system is divided into cells formed by the radio coverage areas of individual base transceiver stations BTS, for which reason the systems are also often called cellular radio systems.

FIG. 1 shows the network elements and the relations between them in a known mobile communications system. The network shown is accordant with a GSM system, which is used as an example in the present application. The solid lines in the figure depict connections including both signalling and call connections while the dashed lines show connections including signalling only. The network includes base transceiver stations BTS which via a radio path may set up connections with the mobile stations MS of mobile station subscribers, base station controllers BSC controlling the base transceiver stations, and mobile services switching centres MSC. Hierarchically below the MSC there are several base station controllers BSC and below these there are several base transceiver stations BTS. The interface between MSC and BSC is called interface A while the interface between BSC and BTS is called interface A-bis.

Call connections which have been set up pass from base transceiver station BTS through base station controller BSC to mobile services switching centre MSC. MSC connects calls to its subordinated base station controllers, to other MSC centres or to a public switched telephone network PSTN or to an integrated services digital network ISDN. The network also includes a network management system NMS, which may be used for collecting information on the condition of the network and for supplying information and programmes to other network elements.

In the idle state, mobile stations measure the signals sent by base transceiver stations and when required they will request a connection setup from the base transceiver station which is serving best at each time. During the connection the network may move the mobile station to another cell through handover between cells whenever required and without disconnecting.

In an active call state, mobile station MS sends measuring results regularly as a report message through the serving base transceiver station BTS to base station controller BSC. The report message includes the measuring results of signal strengths of the serving base transceiver station and of no more than six adjacent base transceiver stations providing the best signal. Besides the mobile station, the base transceiver station BTS also performs measurements of the connection quality. The results of measurements performed by mobile stations and base transceiver stations are analysed in the base station controller BSC. The base station controller also maintains information on free channels in base transceiver stations of its subordinated cells. In a GSM system, the management of radio resources is almost entirely the responsibility of the base station controller BSC.

A mobile station is moved through handover from the serving cell to some adjacent cell e.g. when The measuring results of a mobile station/base transceiver station indicate a low signal level and/or quality of the present serving cell and a better signal level can be obtained from an ambient cell, some ambient cell allows communications at lower transmission power levels, when a mobile station MS has moved too far from the serving base transceiver station BTS, or when there is too much load in the serving cell.

Handover may also be done for some other reason, e.g. due to trouble in a base transceiver station. Factors affecting the choice of target cell in handover are e.g. the signal level and/or load of the target cell. To ensure stability of the mobile communications network, the measuring results and parameters used in handover are averaged over a certain time slot. In this way, handover is made less susceptible to distorted measuring results that may be caused by temporary interference or fading.

Handovers may be done

Inside a cell (intra-cell handover), between two cells subordinated to the same base station controller (handover between base transceiver stations), between cells subordinated to two base station controllers subordinated to the same mobile services switching centre MSC (handover between base station controllers), or between cells subordinated to two different mobile services switching centres MSC (handover between mobile services switching centres).

Handovers are almost solely the responsibility of the base station controller BSC. The mobile services switching centre MSC participates only in such handovers between base station controllers which are due to loading of the cell.

This invention relates to such a handover due to excessive cell loading the basic principle of which is illustrated in FIG. 2. The figure shows seven cells, cells A–G, wherein the load situations are different. Cell A is loaded to the extreme limits of its capacity. Cell C is loaded a little more lightly than cell A. The loading of cells B and E is normal in view of their capacity, while cells D, F and G are lightly loaded. The load situation is proportionate to the thickness of oblique lines in the cells shown in the figure. From the viewpoint of the whole, the optimum network operation is achieved when the loads of all cells are on the same level, or when at least all cells have resources for setting up new connections. To achieve this situation, the load of cell A is discharged through handovers indicated by arrows and due to the loading of the cell into cells D, F and G which are lightly loaded.

With the aid of handover due to excessive cell loading, room for a new connection can be made in a cell. If there is no room for a connection, the connection is handed over to another channel through directed retry already in the call setup phase. However, directed retry in the call setup phase must be made only on the basis of a few measuring reports. The handover target cell must hereby be chosen on a basis of very deficient measurements. On the other hand, at least some mobile stations having a connection with a base transceiver station of the cell would typically achieve a similar connection quality also with some other base transceiver station. From the viewpoint of the whole it is hereby most advantageous to move from the cell one or several mobile stations in an active state to adjacent cells and to set up the new connection without any handover in the call setup phase.

Another example of the advantages of handover due to excessive cell loading is a situation where there is one free channel both in cell S1 and in cell S2, and an attempt is made in cell S1 to set up a high-speed connection requiring the use of two channels. It is hereby possible with handover to move one of the connections in cell S1 to cell S2, whereby two free channels are obtained in cell S1 for use by the new connection.

The following is an examination of a state-of-the-art handover due to excessive cell loading as described in the GSM 08.08 (version 4.7.1) specification published by the European Telecommunications Standards Institute ETSI, the required signalling for which is shown in FIG. 3.

MSC inquires of base station controller BSC about the congestion situation of an individual cell by sending to the base station controller a RESOURCE REQUEST message 301, wherein the cell, the type of reporting and the reporting period, if any, are identified.

Base station controller BSC begins reporting on the utilisation rate of the cell's capacity with the type of reporting stated by MSC. The base station controller is constantly monitoring the interference levels of free channels. Free channels are divided according to their interference level into five classes determined by the network management system NMS. BSC reports to MSC on the number of free channels in each interference level class in its transmitted RESOURCE INDICATION message 302.

The mobile services switching centre MSC studies the information which it has received on the load situation of the different cells and at point 303 in FIG. 3 it checks if the EXIT CRITERIA triggering handover due to cell loading are met for some cell. EXIT CRITERIA are a criterion that is defined in the mobile services switching centre MSC separately for each cell and that defines the situation where the cell load should be reduced. By establishing the criterion it is possible e.g. to determine the aim that at least 1 channel should always be kept free in the cell.

MSC appoints as target cell candidates a set {Si} of those cells wherein the ENTRY CRITERIA are met. ENTRY CRITERIA define a situation where the cell load may still be increased without problems with such handovers due to traffic which are allocated to the cell. Traffic-based handovers allocated to the cell can be allowed e.g. in such situations where there are more than 4 free channels in the cell in interference classes 1, 2 and 3. To be able to make a decision on handover due to cell loading, the mobile services switching centre MSC will thus also need information on the load situation of cells adjacent to the cell, besides the information it has received from the loaded cell itself.

Having found that handover due to loading is necessary, having concluded how many mobile stations must be moved from the cell and having found target cell candidates for handovers, the mobile services switching centre sends a request to the base station controller by handover to move a certain number of mobile stations out of the cell by sending a HANDOVER CANDIDATE ENQUIRY message 304 to the base station controller. In the message the mobile services switching centre names the cell from which the handovers are made, the number of mobile stations which should be moved out of the cell and the set {Si} of target cell candidates for the handover.

The base station controller at point 305 begins to move out of the congested cell the number of mobile stations requested by the mobile services switching centre MSC into the cells {Si} named in the HANDOVER CANDIDATE ENQUIRY message of the mobile services switching centre. The base station controller decides which mobile stations it will move from the congested cell and to which cells named by MSC it will move them. The base station controller bases its decision on those measuring reports of mobile stations which it knows.

A mobile station can be moved from cell S1 by handover into cell S2, if averaged measurements by the mobile station of signal strengths of cell S2 indicate the signal of cell S2 to be higher than the TRHO TARGET LEVEL(S2) limit value predetermined for it in cell S1. The TRHO TARGET LEVEL(Si) limit values are established for the adjacent cells Si of each cell, individually for each cell. The idea of using the TRHO TARGET LEVEL parameter is to make the handover due to cell loading into such a cell where the connection between mobile station and base transceiver station would be of too poor a quality.

Having decided which mobile stations it wishes to move out of the congested cell and which are the handover target cells for individual mobile stations, the base station controller begins the handovers. If a handover target cell for a mobile station is under the management of the same base station controller, BSC will send to mobile station MS through base transceiver station BTS a HANDOVER COMMAND message, wherein it states the new channel for use by the mobile station. If the target cell is subordinated to another base station controller BSC2, BSC will send to the mobile services switching centre a HANDOVER REQUIRED message with a "response to MSC's request" reason code, wherein it gives a list in an order of preference of possible handover target cells. Having begun the handovers, BSC states in the HANDOVER CANDIDATE RESPONSE message 306 to MSC how many mobile stations it is moving.

Implementation of handover due to traffic requires parametrisation both in the base station controller BSC and in the mobile services switching centre MSC. The TRHO TARGET LEVEL parameter must be defined in the base station controller BSC for each adjacent cell of the cells. If the TRHO TARGET LEVEL parameter is not defined for some adjacent cell Sj of cell Si, then no handover due to loading of cell Si can be done into cell Sj.

The EXIT CRITERIA condition must be defined in the mobile services switching centre for all those cells from which handover due to cell loading can be made. The ENTRY CRITERIA parameter must be defined for all those cells, into which load of other cells should be moved through handover due to cell loading. Since parametrisation involves much work and it must be done in several different places, handover due to cell loading is typically used in those cells only where there is a constant congestion. This is why state-of-the-art handover due to cell loading is hardly used at all for relieving short loading peaks caused by congestion situations e.g. due to traffic accidents.

Drawbacks of the method described above are the laborious nature of parametrisation required by the method and loading of interface A between the base station controller BSC and the mobile services switching centre MSC. Interface A will be unnecessarily loaded especially in handovers due to the internal cell loading of one base station controller BSC. Additional problems may be caused in networks where base station controllers and mobile services switching centres made by different manufacturers are used. Both the mobile services switching centre MSC and the base station controller BSC must hereby support handovers due to cell loading.

It is an objective of the present invention to eliminate or at least to alleviate the state-of-the-art problems mentioned above. This objective is attained with the method defined in the independent claim.

BRIEF DESCRIPTION OF THE INVENTION

The inventive idea is to implement centrally in one base station controller BSC such a handover which is due to cell loading. The implementation requires implementation in the base station controller of all those functions and criteria which relate to handover due to cell loading.

Advantages achieved through centralisation are e.g. that the required signalling will be lighter. Since the method is independent of other network elements, all necessary parametrisation is done in one network element. This facilitates introduction and maintenance of the functionality.

As all information and functionality needed for deciding on handover are in the base station controller, the handover criteria may be defined as dynamic criteria. For example, when setting up new calls, a check is made in base station controller BSC to find out if the free capacity of the cell is sufficient for setting up a new connection, so this information may be used flexibly as a basis for the EXIT CRITERIA and ENTRY CRITERIA which will trigger off a handover due to cell loading. In this way call establishment is always possible in the best cell.

BRIEF DESCRIPTION OF THE DRAWINGS

The invention will be described more closely with reference by way of example to the appended drawings, wherein.

DETAILED DESCRIPTION OF THE INVENTION

Figure 1:
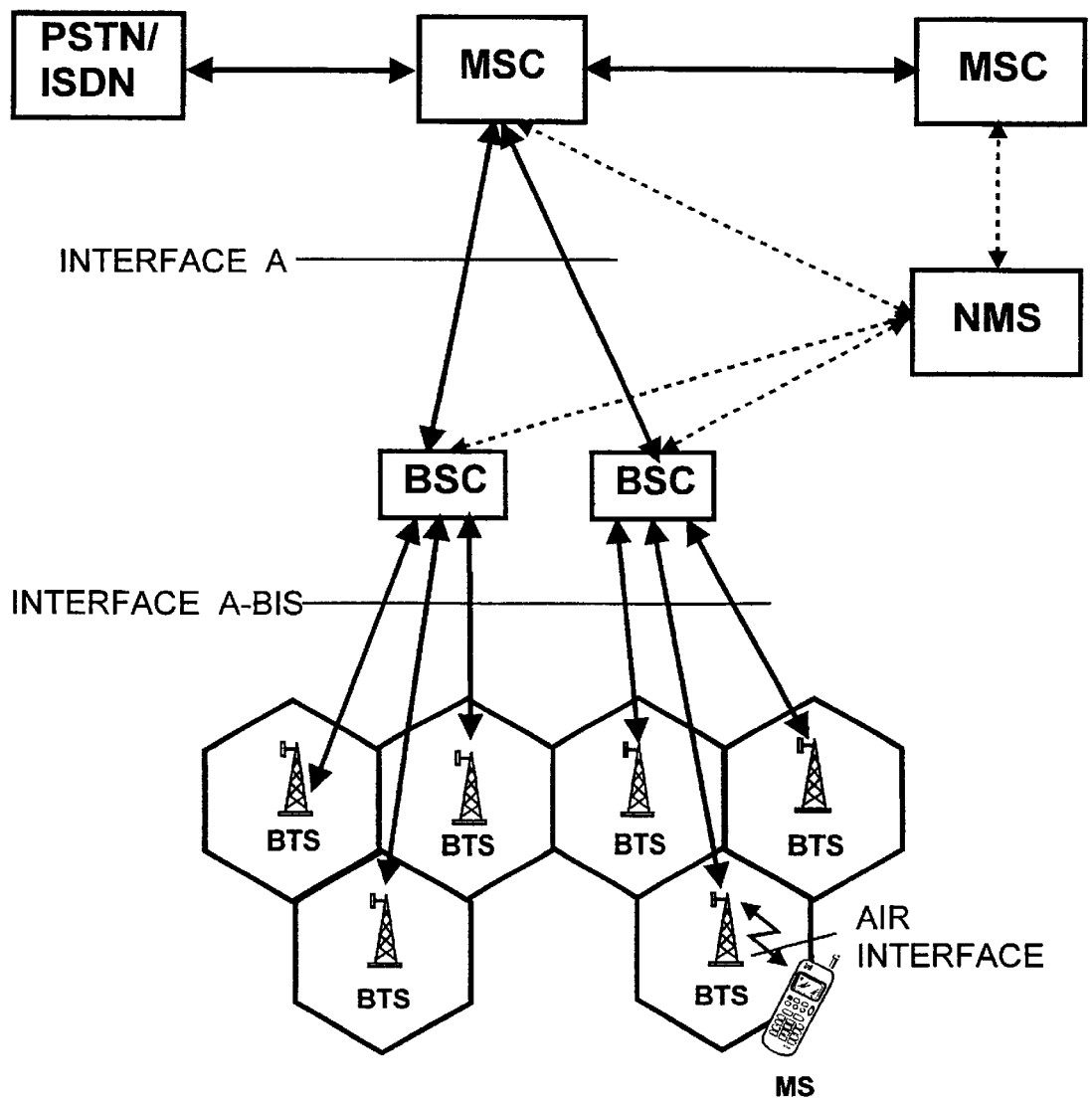
FIG. 1 shows the structure of a known cellular radio network.
Figure 2:
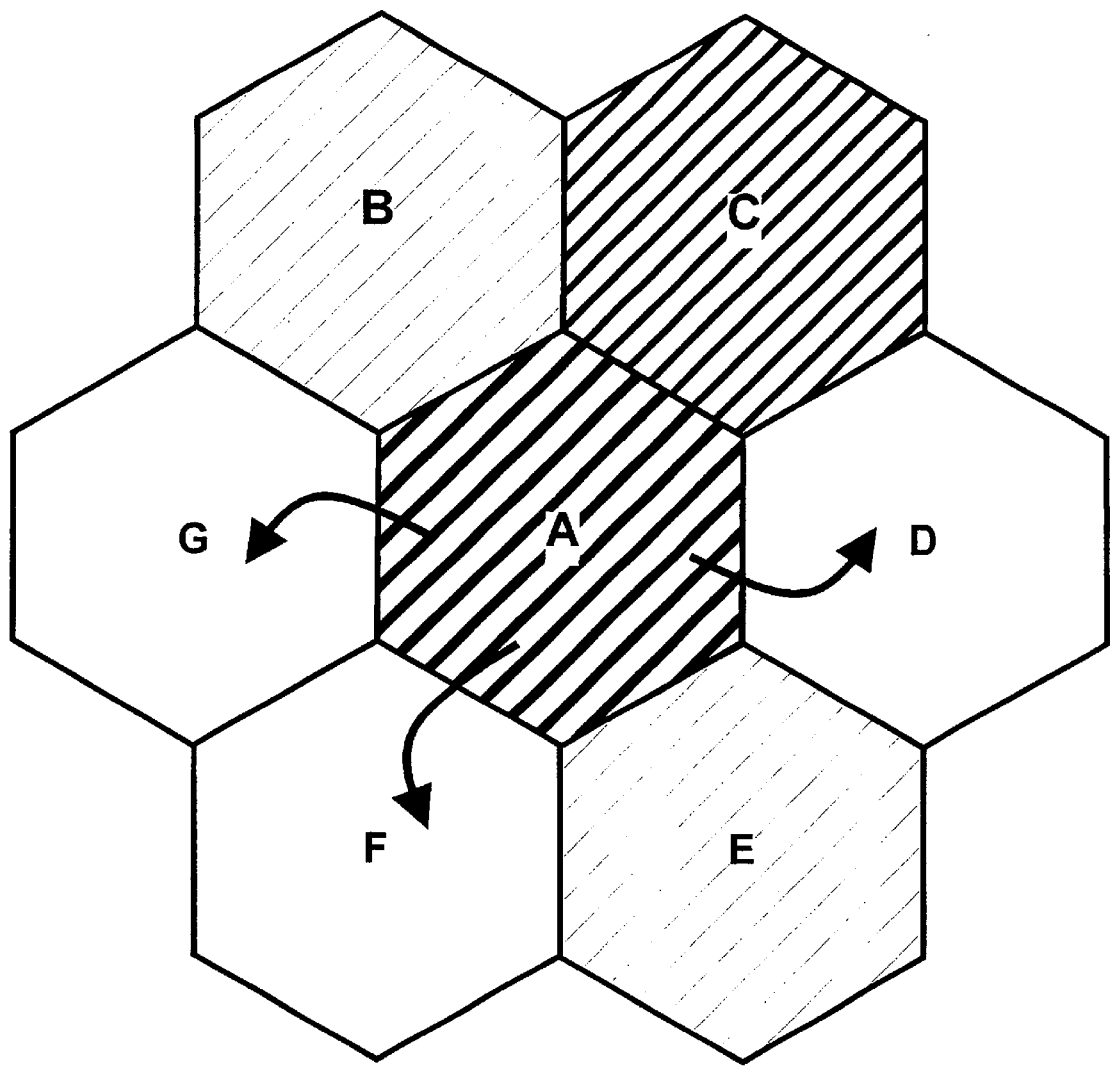
FIG. 2 shows the principle of handover due to cell loading.
Figure 3:
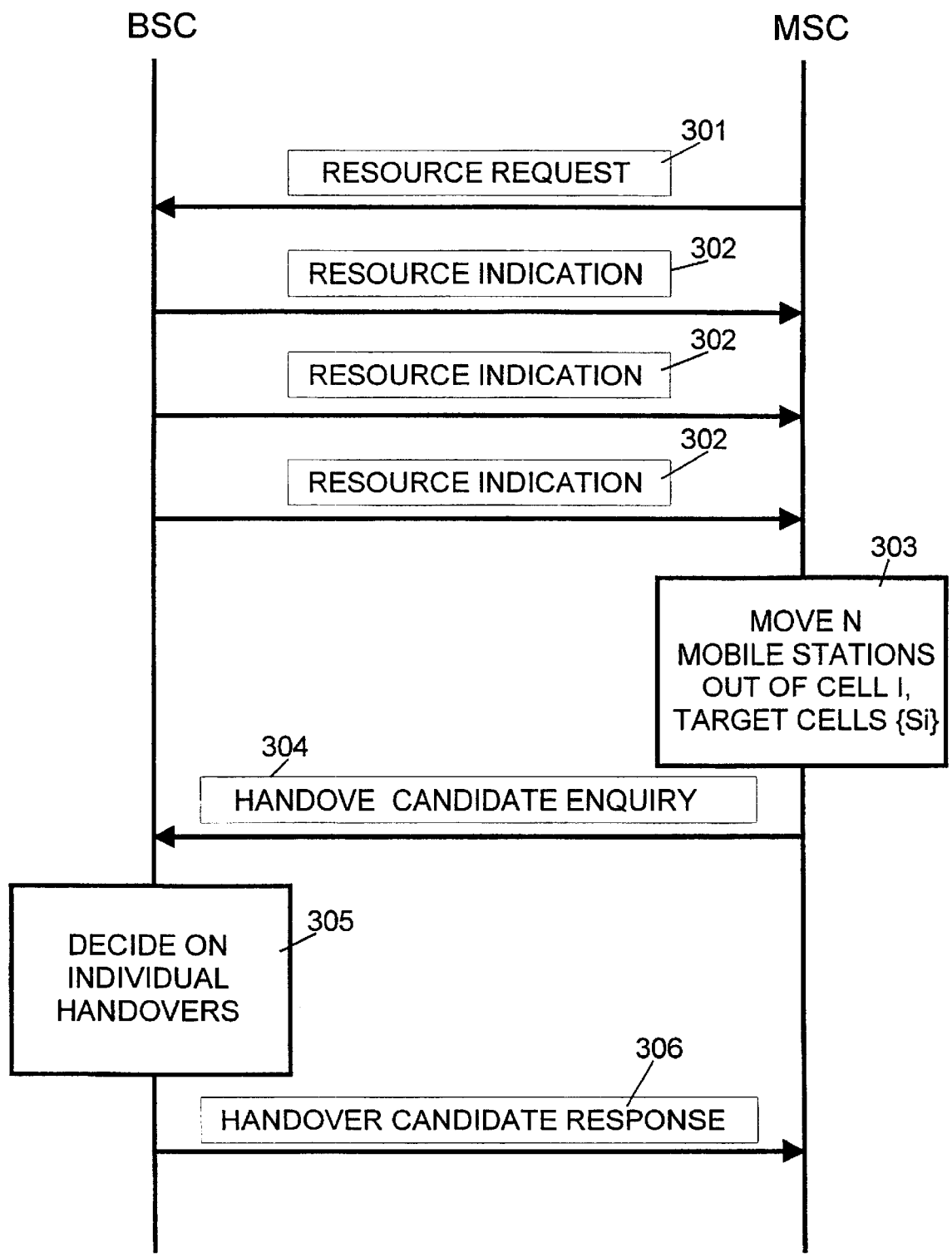
FIG. 3 shows signalling in state-of-the-art handover due to traffic.

In the invention, handovers due to cell loading are carried out in a centralised fashion in base station controller BSC. Implementation of the invention thus requires implementation of the algorithm monitoring the EXIT CRITERIA triggering off the functionality and implementation of the target cell selection algorithm in the base station controller.

For example, such a situation where there is no free channel in a cell can be defined as the EXIT CRITERIA for triggering off a handover due to cell loading in a direction out of the cell. In its simplest form the criterion may be defined to be the same for all cells subordinated to the base station controller. Since better information about the load situation of cells is available to the base station controller than to the mobile services switching centre, the EXIT CRITERIA may also alternatively be defined as dynamic criteria. An example of a criterion defined as a dynamic one is such a criterion which rules that at least so many channels should always be kept free in the cell that the connection setups requested in the connection setup requests received by the base transceiver station can be implemented through the base transceiver station. Moving of load out of the cell is hereby started with the setting up of a new connection when the channels which are free at the base transceiver station are not sufficient for setting up the requested connection.

For example, such a situation where there are 3 free channels in a cell may be defined as the ENTRY CRITERIA. In its simplest form the ENTRY CRITERIA is also the same for all cells subordinated to the base station controller. One advantage compared with the state of the art is that when checking if the EXIT CRITERIA condition is fulfilled in the base station controller, such information on the target cell load is available for the comparison which is more up to date than in a comparison performed in the mobile services switching centre. The ENTRY CRITERIA too may be defined to change dynamically e.g. based on the setup rate of new connections estimated by the time. The base station controller BSC has information on interference in free channels of the cells which is considerably more accurate than the information available to the mobile services switching centre. In addition, the BSC has information about the measuring reports of mobile stations. The ability of a cell to receive handovers due to the loading of another cell can be assessed in the base station controller by combining these two pieces of information, whereby this assessment is much better than the one done in the mobile services switching centre simply based on channel interference values.

The TRHO TARGET LEVEL radio criterion established for the target cell's signal in a handover due to cell loading may be defined e.g. with the aid of the RXLEV MIN radio criterion used in other handovers. In its simplest form the radio criterion of a handover due to cell loading is considered fulfilled always when that radio criterion is fulfilled which is used in other handovers to the cell. However, the return of a mobile station almost immediately to the original cell through a handover done to achieve the best radio channel must be prevented in some other way, e.g. by using a timer.

In one preferable embodiment of the invention, some mobile stations are directed out of a loaded cell by reducing the HO MARGIN criterion established for handovers out of the cell based on the quality of the radio channel. The channel is changed by a handover based on the radio channel quality, if it is found that the same signal-to-noise ratio is achieved in the target cell at a transmission power below a certain HO MARGIN. For example, 6 dB is a typical HO MARGIN value. The idea behind using the margin is to reduce handovers back and forth between cells. By lowering the required power margin, some mobile stations of the loaded cell are made to perform a handover according to the normal handover procedure into another cell. Correspondingly, for handovers into the cell, the HO MARGIN must be increased, whereby those handovers are reduced which are directed to the cell and which will add to the load of the cell. This embodiment is examined in FIG. 4.

Figure 4:
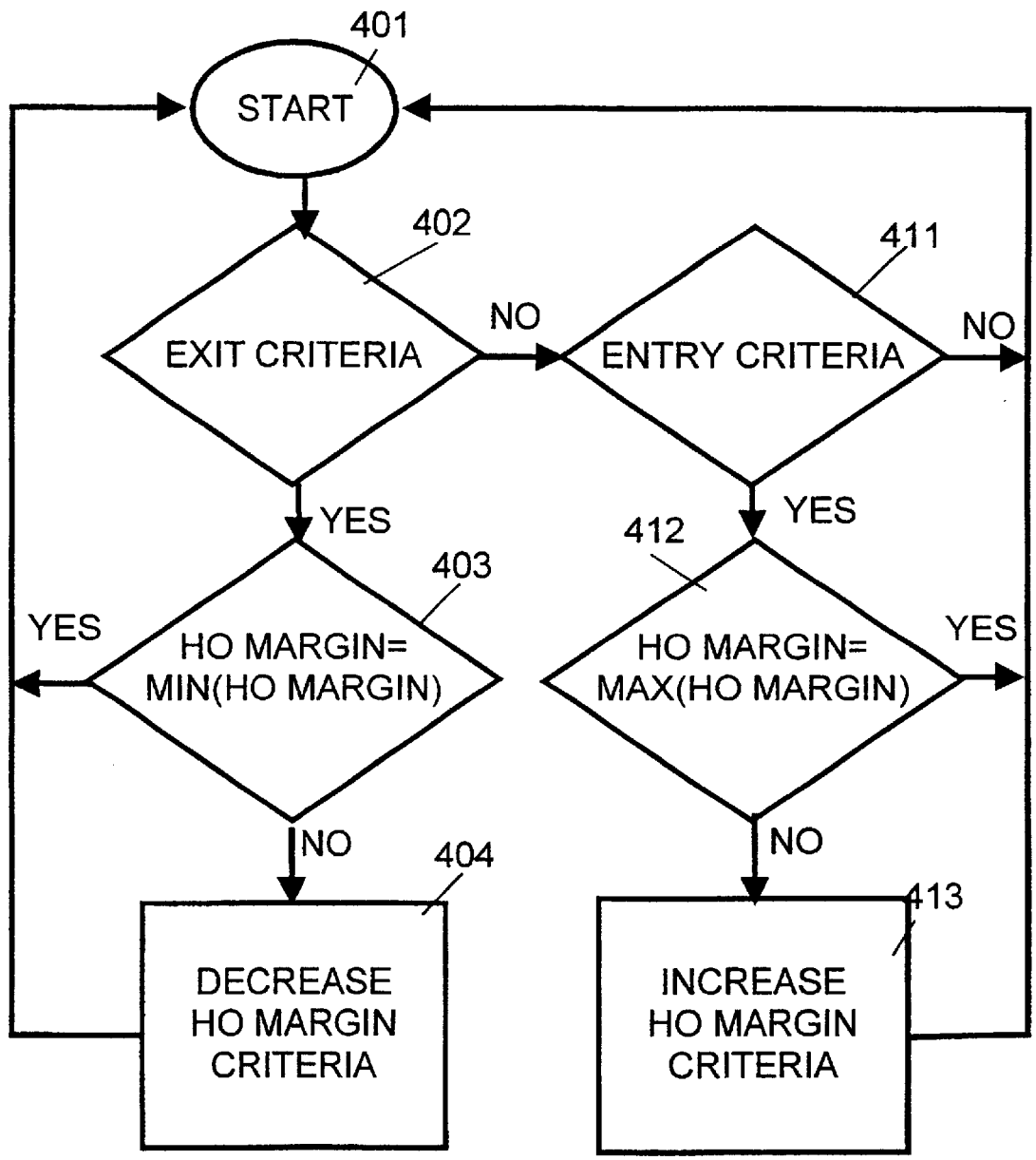
FIG. 4 shows the structure of an algorithm which checks the meeting of exit and entry criteria.

FIG. 4 shows an algorithm constantly checking the fulfilment of EXIT CRITERIA and ENTRY CRITERIA. If it is found at point 402 that EXIT CRITERIA are fulfilled, progress is made to point 403 where a check is made to find out whether HO MARGIN is already at its MIN(HO MARGIN) maximum value which was given to it in the network management system NMS, for example. If this is not the case, the function proceeds to point 404, where the HO MARGIN power margin for handovers based on the radio channel quality is reduced by a predetermined step. The criteria may be lowered equally, e.g. by 1 dB, for all target cell candidates, whereby the necessary parametrisation is minimised. Similarly, an individual reduction step may be defined for each target cell candidate when required.

If EXIT CRITERIA are not met, a check is made at point 411 to find out if ENTRY CRITERIA are met. If the criterion is not met, the function returns to the beginning. If the criterion is met, a check is made at point 412 of whether HO MARGIN is already at its established maximum MAX(HO MARGIN) value. If this is not the case, the power margin is raised by a predetermined step. It is an advantage of this embodiment that there is no need at all for those separate TRHO TARGET LEVEL radio criteria of handover due to cell loading, which must be parametrised separately for each neighbour cell of the cell.

Figure 5:
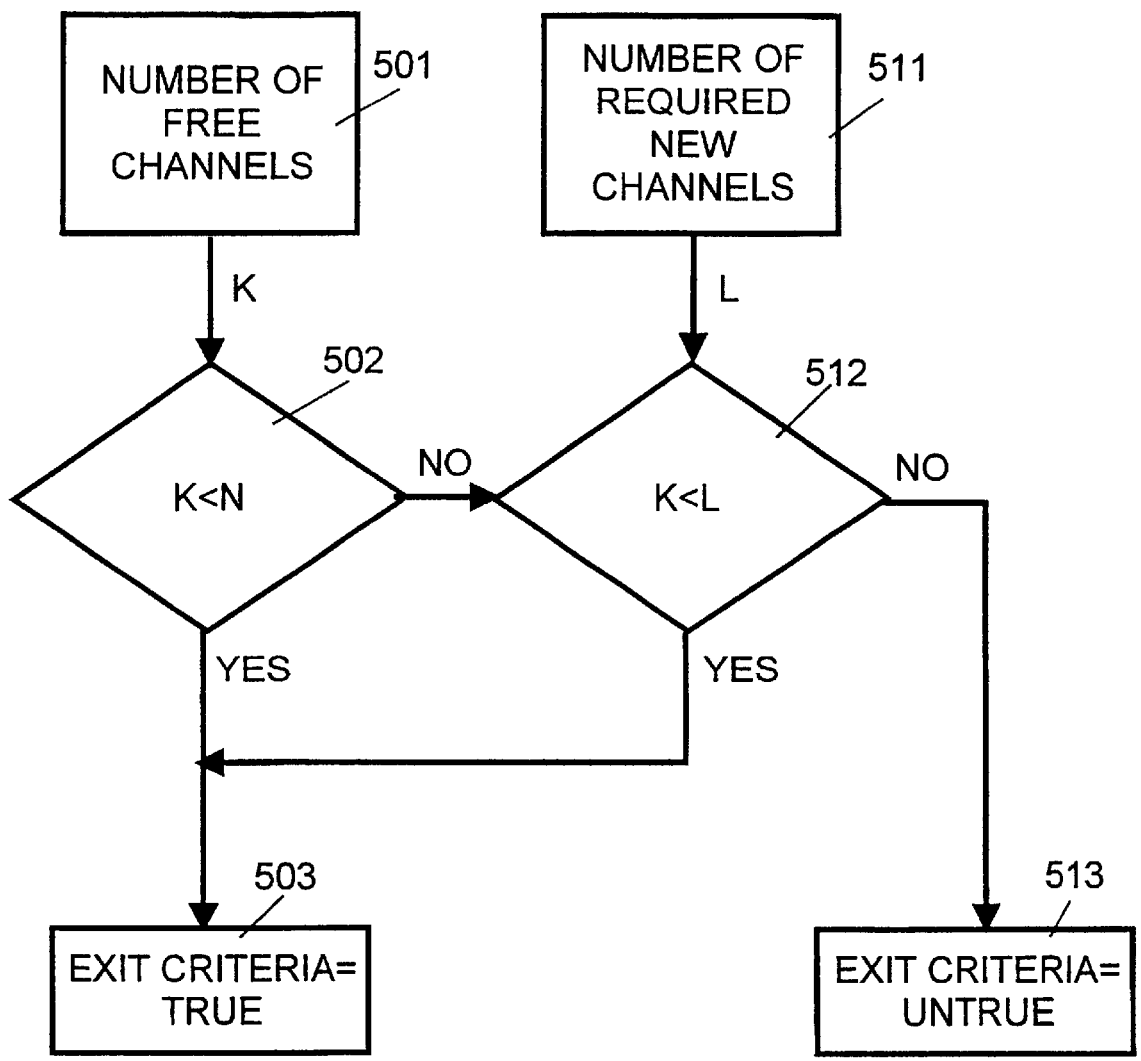
FIG. 5 shows the structure of the algorithm triggering off handover due to cell loading.

An algorithm as shown in FIG. 5 may e.g. be used to check if the EXIT CRITERIA are met. From the call control the algorithm gets constant information on the number K of free channels in the cell (point 501) and on the number L of channels required for implementation of the connection requests made to the cell (point 511). In addition, parameter N is supplied to the algorithm to determine the minimum number of channels which should be kept free. If K<N or K<L, the function proceeds to point 503, where it is found that EXIT CRITERIA are met. Otherwise the function proceeds to point 513, where it is found that the criterion is not met.

The following is a study of an example of an implementation of handover based on loading of the cell in accordance with the invention. All cells are subordinated to the same base station controller. The same EXIT CRITERIA are established for all cells which means an aim always to keep at least one channel free in every cell, and another aim is always to provide space for new connection requests in the cell through handovers due to cell loading.

The same ENTRY CRITERIA are also defined for all cells which means that handovers due to the loading of another cell may be made to the cell, if at least three free channels will remain in the cell after the handover.

Figure 6:
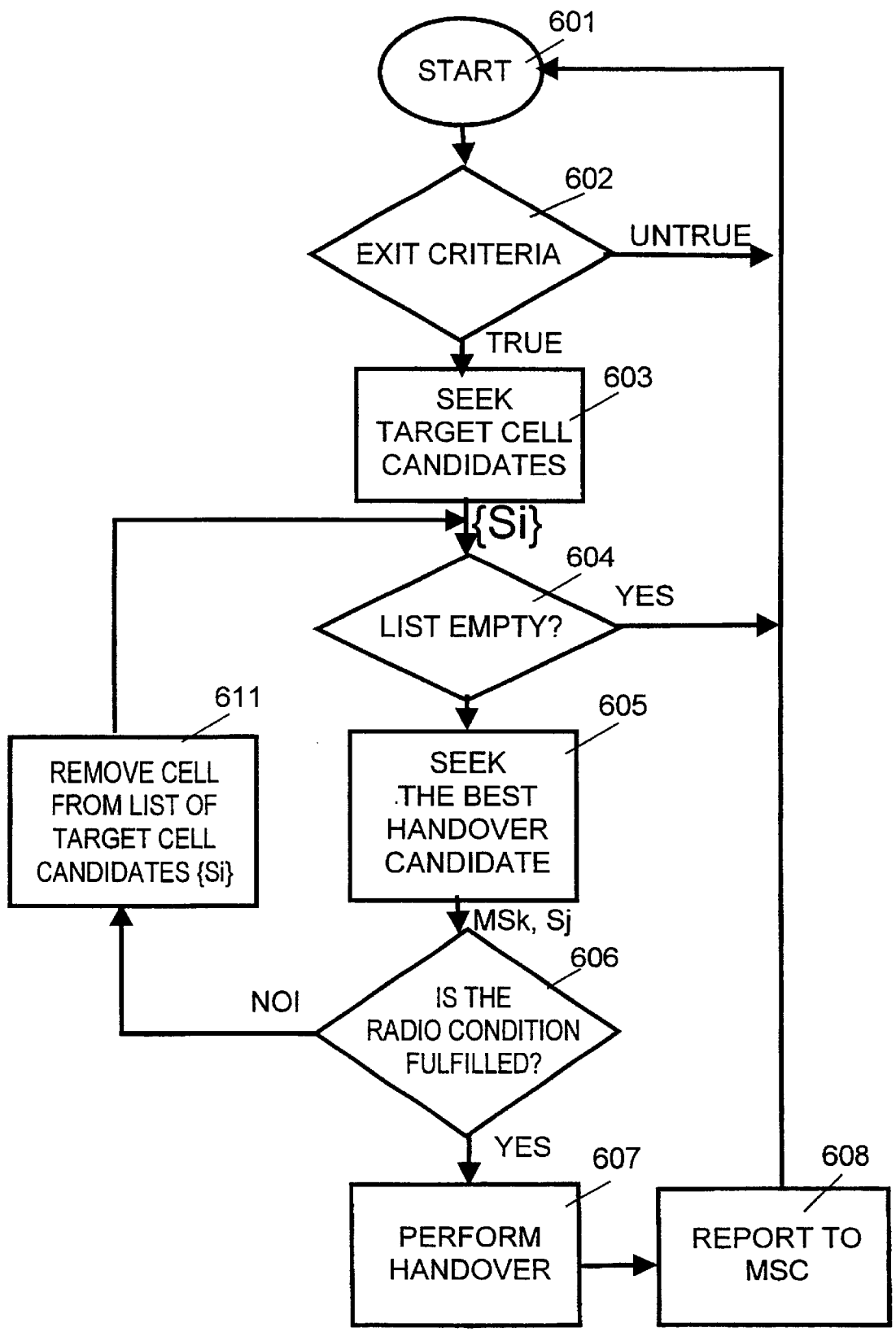
FIG. 6 shows the structure of the algorithm performing handover due to cell loading.

FIG. 6 shows a flow chart of an algorithm located in the base station controller to control handovers due to cell loading. At condition point 602 the algorithm makes a constant check on whether the mentioned EXIT CRITERIA are met. When the condition is met, steps are started to move the mobile station from the congested cell. Target cell candidates {Si} for a handover to be performed due to cell loading are sought at point 603. Those cells belong to the set of target cell candidates {Si} for which the ENTRY CRITERIA described above are met. At point 604 such a mobile station MSk is sought, for which the best radio parameters are achieved in some cell Sj belonging to the set {Si} according to the measurements of neighbour cell signals which are made by mobile stations. A check is made at point 605 of whether the handover candidate defined at point 604 as the best candidate meets the radio condition, that is, the signal strength measured by mobile station MSk from cell Sj exceeds the TRHO TARGET LEVEL. If the condition is fulfilled, the function proceeds to point 606, where handover is performed for mobile station MSk to cell Sj. At point 607 a notification of the performed handover is given to mobile services switching centre MSC. In the whole functionality this is the only point visible to mobile services switching centre MSC.

If it is found at point 605 that the radio condition is not met, the function proceeds to point 611, where cell Sj is removed from the set of target cell candidates {Si}. If cells still remain in the list after this removal, the 15 function is continued from point 604. If the set is empty, the function is ended without any handover.

Figure 7:
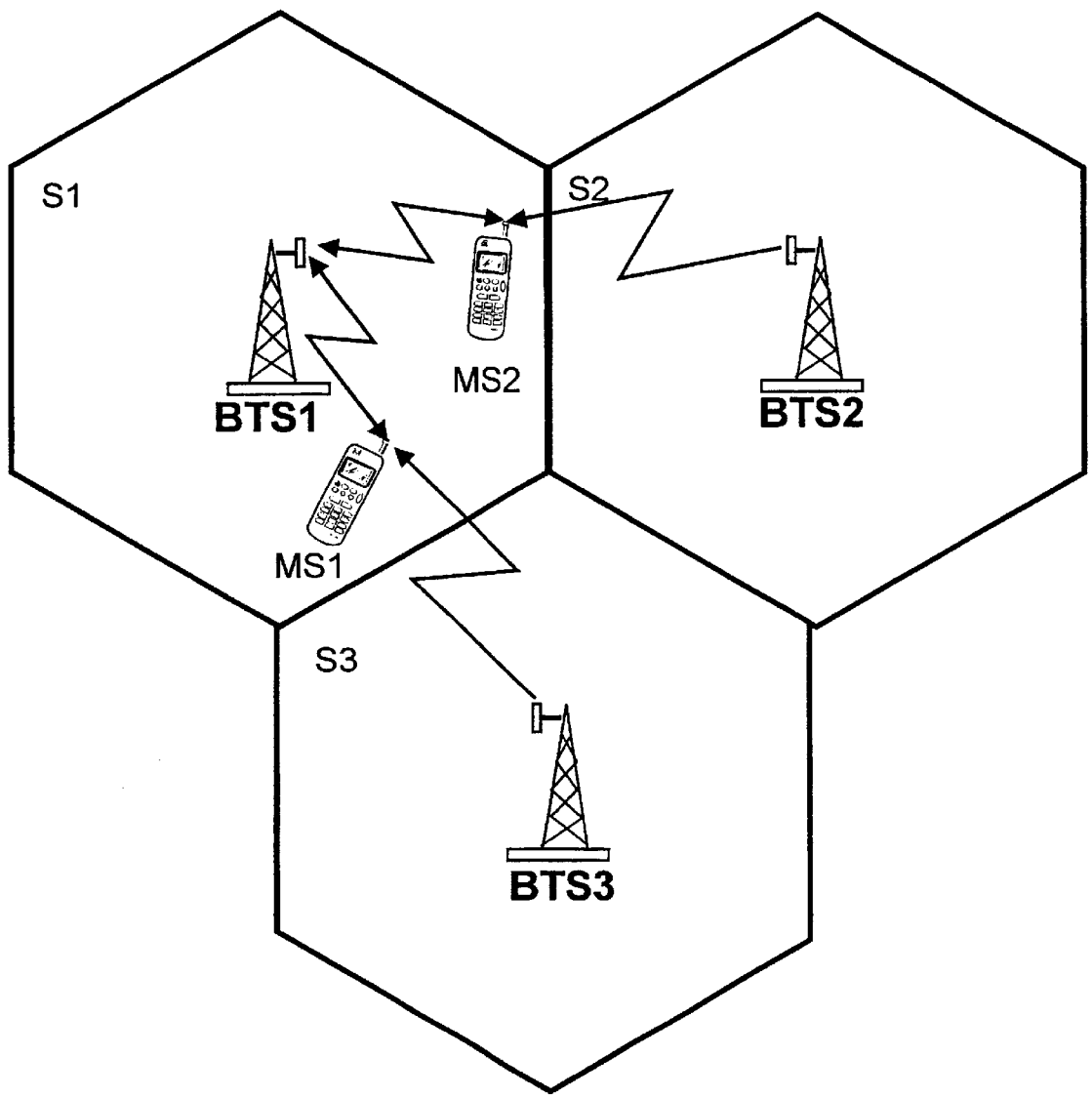
FIG. 7 shows a move of two mobile stations from a loaded cell to other cells by handover.

A situation is examined in FIG. 7, where the load of cell S1 is made lighter by handovers to cells S2 and S3. In cell S1 1 channel is free, in cell S2 4 channels and in cell S3 4 channels are free.

At this stage, the base transceiver station of cell S1 receives a request to set up a new connection using one channel, and it sets up the connection. After the connection has been set up, all channels of cell S1 are in use. It is then found that EXIT CRITERIA are met in cell S1. In response to fulfilment of the criterion, progress is made to point 603 in the algorithm shown in FIG. 6 which controls handovers due to cell loading. It is found at point 603 that ENTRY CRITERIA are met both in cell S2 and in cell S3. From measurement reports received by the base station controller from mobile stations in active co-operation with the base transceiver station of cell S1 the base station controller finds that the best radio parameters at the moment for a connection between the mobile station in cell S1 and the base transceiver station of either cell S2 or S3 are achieved between mobile station MS1 and the base transceiver station of cell S3. A check is made at point 605 to find out if the signal strength measurement reported by mobile station MS1 on the signal of the base transceiver station of cell S3 exceeds the limit value defined by the TRHO TARGET LEVEL parameter. Since this is the case in our example, mobile station MS1 is moved by handover at point 606 to cell S3. Finally, the performed handover is reported to mobile services switching centre MSC with a HANDOVER PERFORMED message. After the performed handover there is 1 free channel in cell S1, there are 4 free channels in cell S2 and 3 free channels in cell S3.

The base station controller then receives a request to set up a connection using two parallel channels in cell S1. In response to the request for a connection setup, the base station controller checks if there is sufficient free capacity in cell S1 for a new connection. Since this is not the case, EXIT CRITERIA are fulfilled, and the algorithm of FIG. 6 proceeds to point 603. It is found at this point that ENTRY CRITERIA are fulfilled in cell S2 only. From measurement reports received by the base station controller from mobile stations in active co-operation with the base transceiver station of cell S1 the base station controller finds that the best radio parameters at the moment for a connection between a mobile station in cell S1 and the base transceiver station of cell S2 are attained between mobile station MS2 and the base transceiver station of cell S2. A check is made at point 605 to find out if the signal strength measurement reported by mobile station MS2 on the signal of the base transceiver station of cell S3 exceeds the limit value defined by the TRHO TARGET LEVEL parameter. Since this is again not the case in our example, mobile station MS2 is moved by handover at point 606 to cell C2. Finally, the performed handover is reported to mobile services switching centre MSC. After the performed handover there are 2 free channels in cell S1 and 3 free channels both in cell S2 and in cell S3.

After the performed handover there are two free channels in cell S1, so it is possible to set up the requested connection using two parallel channels. When the connection has been set up, ENTRY CRITERIA of cell S1 are met, but since the set of target cell candidates {Si} to be formed at point 603 is empty, the cell load can not be relieved through handovers due to loading until new capacity will become free in some cell.

Figure 8:
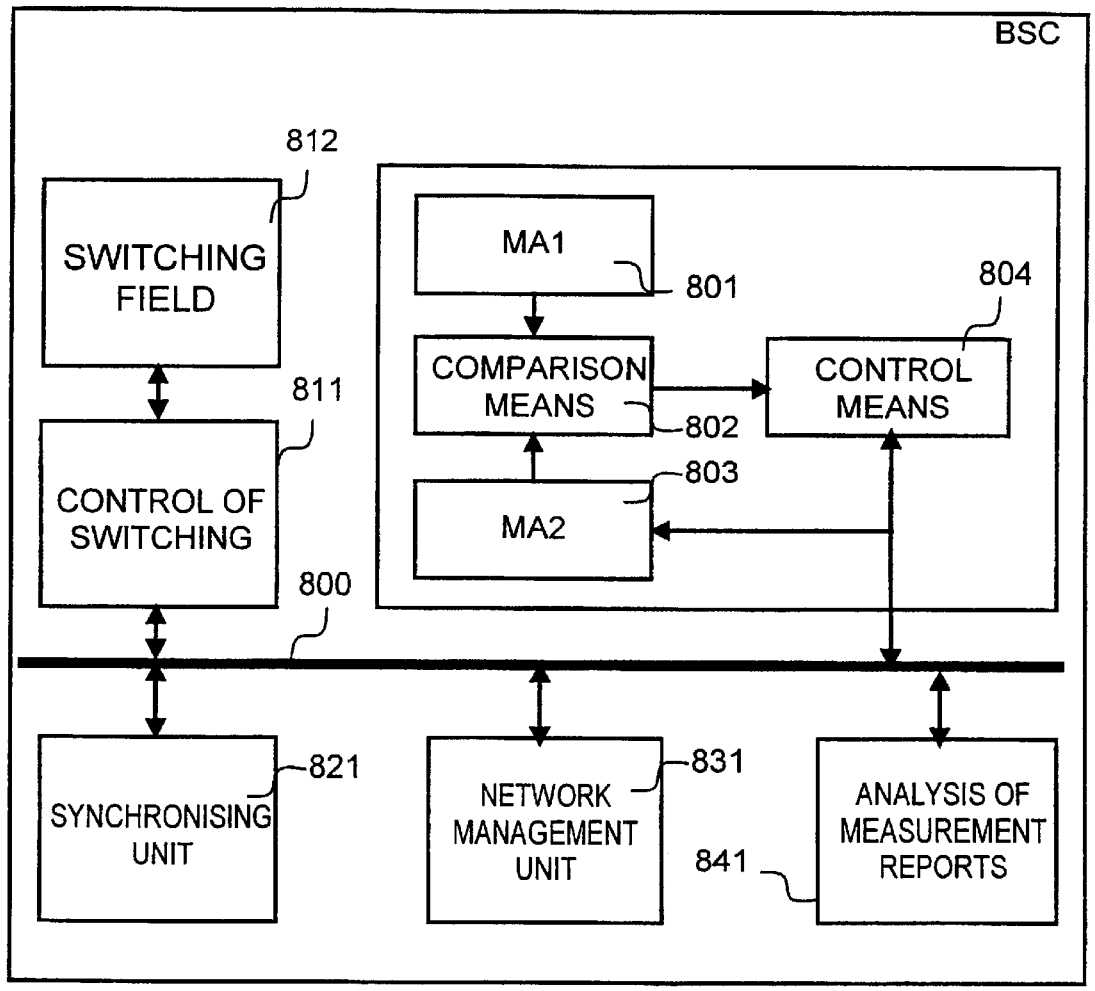
FIG. 8 shows functional blocks of a base station controller according to the invention.

FIG. 8 shows an example of the structure of a base station controller realising the method according to the invention. According to the invention, there must be a memory area MA1 801 in the base station controller where information is stored on the criteria triggering off a handover due to cell loading. In addition, according to the invention the base station controller must be able with comparison means 802 to compare the cell load situations known to it according to the state of the art and stored in memory area MA2 803 with the criteria stored in memory area MA3 801. Based on the comparison, handover implementation means 804 are triggered off to carry out the handover function located in the base station controller in a state-of-the-art fashion. The means implementing the functionality according to the invention may be connected e.g. to bus 800, to which other units carrying out BSC functions are also connected. Such units may be e.g. a control of switching 811 controlling switching field 812, a synchronising unit 821 attending to synchronisation of the base station controller, a network management unit 831 attending to connections to the network management system NMS and a measurement report analysis unit 841 processing the measurement reports of mobile stations and base transceiver stations.

The method can not be used directly in handovers between base station controllers based on cell loading. In handovers between base station controllers, the number of which in practice is considerably less than the number of internal handovers of base station controllers, it is possible to proceed e.g. through state-of-the-art handovers. Another alternative is also to do handovers between base station controllers in accordance with the invention by making a decision on handover in the base station controller BSC and by sending HANDOVER REQUIRED to the mobile services switching centre MSC with cell loading as the reason code. It must be noted, however, that the latter embodiment is not entirely compatible with the GSM 08.08 specification. A third alternative embodiment is in accordance with an embodiment of the invention to change as shown in FIG. 4 the signal margin necessary in handovers based on the better radio channel. Handovers are then performed as normal handovers between base station controllers to achieve a better radio channel.

It is obvious that the embodiments of the invention are not limited to the embodiments presented as examples above, but they may vary in accordance with the scope of the appended claims.

What is claimed is:

1. A method of implementing handovers based on the load situation of a base transceiver station and handovers based on signal quality in a mobile communications system which includes at least mobile stations, base transceiver stations, base station controllers having information about the load structure s of the base transceiver stations, and mobile services switching centers, the method comprising:

performing measurements by mobile stations in connection with a base transceiver station of a signal strength of neighboring base transceiver stations, and reporting the results of the measurements to the connected base transceiver station;

relaying, by the base transceiver station, the measurement reports of the mobile stations to a base station controller;

performing a handover to a channel in the base transceiver station offering better signal quality when the signal quality meets predetermined first criteria to achieve a better radio channel quality;

performing handovers, intended to reduce the load of the base transceiver station in the system, from the base transceiver station to neighboring base transceiver stations;

storing in the base station controller second criteria information, the meeting of which indicates that an attempt must be made to reduce the load of the base transceiver station;

performing a check by the base station controller to determine if the second criteria information has been met; and in response to meeting the second criteria information, changing said first criteria by the base station controller in order to direct a part of the load of the base transceiver station to neighboring base transceiver stations.

2. The method according to claim 1, wherein the criteria information include a minimum for the number of channels which are free at the base transceiver station.

3. The method according to claim 2, wherein the minimum is dynamically variable.

4. The method according to claim 2, wherein the minimum depends on that need for setting up new connections which has become known to the base station controller.

5. The method according to claim 1, wherein the criteria information include a minimum requirement for the number of channels which are free at neighboring base transceiver stations of the base transceiver station.

6. The method according to claim 1, wherein the criteria information include a minimum requirement for the results of measurements done by the mobile station of the signal strength of the neighboring base transceiver stations.

7. A base station controller in a mobile communications system including at least mobile stations, base transceiver stations, other base station controllers, and mobile services switching centres, and wherein mobile stations in connection with a base transceiver station perform measurements of the signal strength of neighboring base transceiver stations and report on the measurement results to the base transceiver stations which relay the measurement reports of the mobile stations to the base station controller, a handover to a channel offering better signal quality is performed when the signal quality meets predetermined first criteria to achieve a better radio channel quality, the base station controller has information about the load situation of the base transceiver stations, and handovers may be performed in the system to reduce the load of a base transceiver station from the base transceiver station to neighboring base transceiver stations of the base transceiver station, the base station controller comprising:

storing means for storing a second criteria which triggers a function reducing the load of the base transceiver station, monitoring means for monitoring a meeting of the second criteria; and handover implementation means, responsive to the monitoring means and used in response to the meeting of the second criteria, for changing said first criteria in order to direct a part of the load of the base transceiver station to neighboring base transceiver stations.

* * * * *